(12) United States Patent
Kang (10) Patent No.: US 8,421,709 B2
(45) Date of Patent: *Apr. 16, 2013

(54) IMAGE DISPLAY DEVICE FOR DISPLAYING TWO-DIMENSIONAL PLANE IMAGE AND THREE-DIMENSIONAL STEROSCOPIC IMAGE

(75) Inventor: Hoon Kang, Namyangju-si (KR)

(73) Assignee: LG Display Co., Ltd., Seoul (KR)

( * ) Notice: Subject to any disclaimer, the term of this patent is extended or adjusted under 35 U.S.C. 154(b) by 788 days.

This patent is subject to a terminal disclaimer.

(21) Appl. No.: 12/536,031

(22) Filed: Aug. 5, 2009

(65) Prior Publication Data

US 2010/0265230 A1 Oct. 21, 2010

(30) Foreign Application Priority Data

Apr. 17, 2009 (KR) .................. 10-2009-0033534

(51) Int. Cl.
*G09G 5/00* (2006.01)
(52) U.S. Cl.
USPC ............................................................. 345/6
(58) Field of Classification Search .......... 345/211, 345/679, 1.3, 426, 691, 4–6, 9; 348/59; 349/15
See application file for complete search history.

(56) References Cited

U.S. PATENT DOCUMENTS

2005/0212744 A1* 9/2005 Hada et al. ................ 345/96
2006/0012593 A1* 1/2006 Iriguchi et al. ............ 345/204
2007/0070008 A1* 3/2007 Shin et al. ................. 345/89
2007/0242068 A1* 10/2007 Han et al. .................. 345/427

FOREIGN PATENT DOCUMENTS

EP 0 829 744 A2 3/1998
JP 2010204389 A 9/2010

OTHER PUBLICATIONS

Office Action issued in corresponding German Patent Application No. 102009034092.0-32, mailed Oct. 7, 2010.

* cited by examiner

*Primary Examiner* — Chanh Nguyen
*Assistant Examiner* — Tsegaye Seyoum
(74) *Attorney, Agent, or Firm* — Brinks Hofer Gilson & Lione

(57) ABSTRACT

An image display device comprises an image display panel that displays a 2D or 3D image; a driving circuit that applies a data voltage of a 2D data format for the 2D image or a data voltage of a 3D data format for the 3D image to the image display panel; and a controller that controls the driving circuit according to a 2D mode for displaying the 2D image or a 3D mode for displaying the 3D image, wherein R, G, and B subpixels of the image display panel each comprises first and second fine subpixels divided by one data line and two adjacent gate lines. In the 2D mode, the same data voltage of the 2D data format is applied to the first and second fine subpixels. In the 3D mode, the data voltage of the 3D data format is applied to the first fine subpixel and a black gray voltage is applied to the second fine subpixel.

9 Claims, 8 Drawing Sheets

(Related Art)

FIG. 4

(Related Art)

IMAGE DISPLAY DEVICE FOR DISPLAYING TWO-DIMENSIONAL PLANE IMAGE AND THREE-DIMENSIONAL STEROSCOPIC IMAGE

RELATED APPLICATIONS

This application claims the benefit of Korean Patent Application No. 10-2009-0033534 filed in Republic of Korea on Apr. 17, 2009 the entire contents of which are hereby incorporated by reference.

BACKGROUND

1. Field

This document relates to an image display device for displaying a two-dimensional plane image (referred to as '2D image', hereinafter) and a three-dimensional stereoscopic image (referred to as '3D image', hereinafter).

2. Related Art

An image display device displays a 3D image by using a stereoscopic technique or an autostereoscopic technique.

The stereoscopic technique, which uses a parallax image of left and right eyes of a user with a high stereoscopic effect, includes a glass method and a non-glass method which have been put to practical use. In the glass method, a left and right parallax image is displayed on a direct view-based display device or projector by changing a polarization direction of the left and right parallax image or in a time division method, and a stereoscopic image is implemented by using polarization glasses or liquid crystal shutter glasses. In the non-glass method, generally, an optical plate such as a parallax barrier or the like for separating an optical axis of the left and right parallax image is installed on in front of or behind a display screen.

Figure 1:
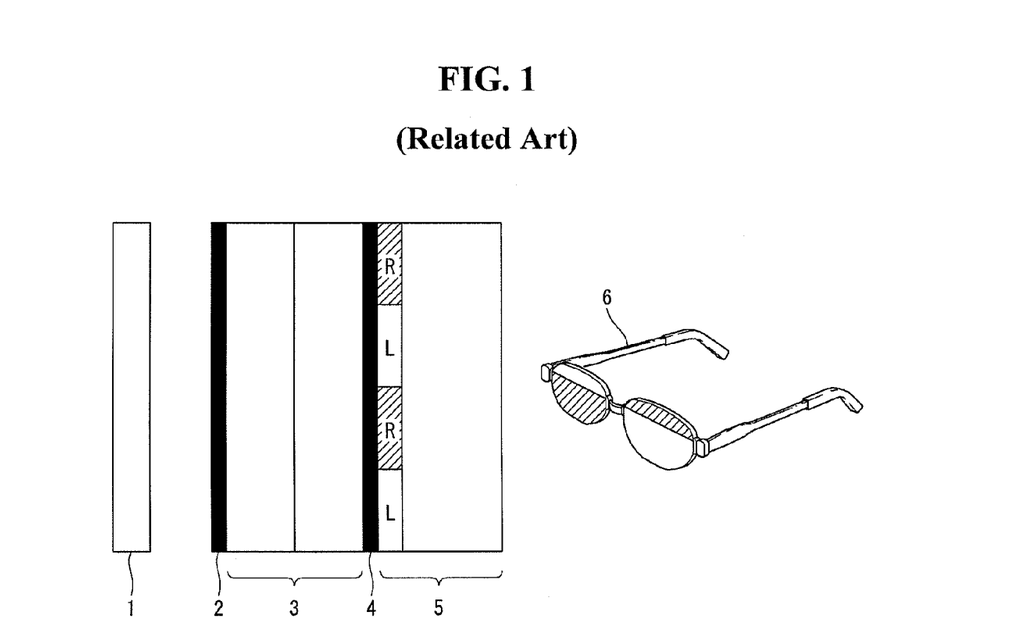
FIG. 1 is a schematic view illustrating a glass type image display device.

As shown in FIG. 1, the glass method may include a patterned retarder 5 for converting polarization characteristics of light made incident on the polarization glasses 6 on a display panel 3. In the glass method, a left eye image (L) and a right eye image (R) are alternately displayed on the display panel 3, and the polarization characteristics made incident to the polarization glasses 6 are converted by the patterned retarder 5. Through this operation, the glass method implements a 3D image by spatially dividing the left eye image (L) and the right eye image (R). In FIG. 1, reference numeral 1 denotes a backlight that irradiates light to the display panel 3, and 2 and 4 denote polarizers attached on upper and lower surfaces of the display panel 3 to select a linear polarization, respectively.

Figure 2:
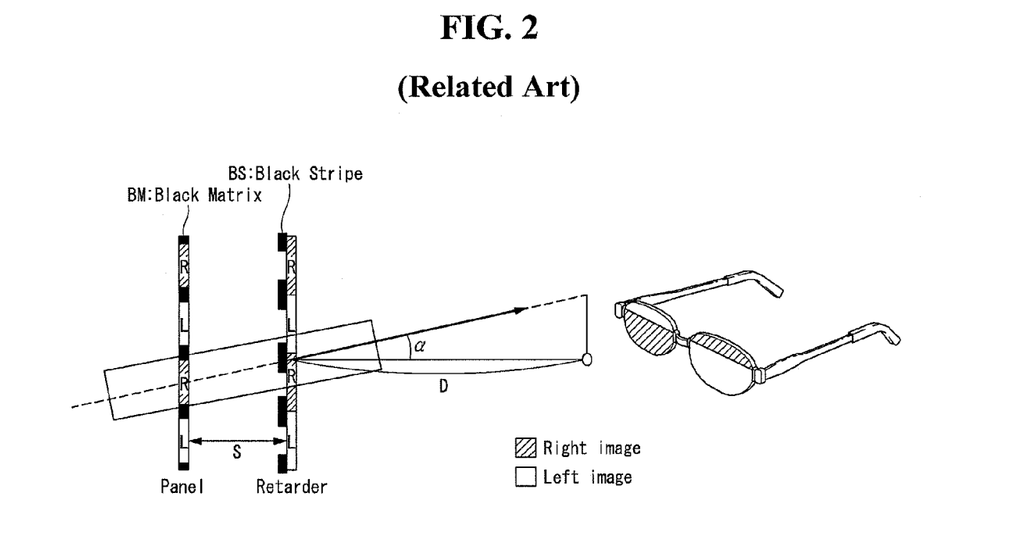
FIG. 2 illustrates formation of black stripes at a patterned retarder region corresponding to black matrixes of a display panel of the related art image display device.

With such glass methods, visibility of the 3D image is degraded due to crosstalk generated at the position of an up/down viewing angle, resulting in that the up/down viewing angle allowing viewing of the 3D image of good picture quality in the general glass methods is very narrow. The crosstalk is generated because the left eye image (L) passes through a right eye patterned retarder region as well as a left eye patterned retarder region and the right eye image (R) passes through the left eye patterned retarder region as well as the right eye patterned retarder region at the up/down viewing angle position. Thus, a Japanese Laid Open Publication No. 2002-185983 discloses a method for obtaining a wider up/down viewing angle by forming black stripes (BS) at the patterned retarder regions corresponding to black matrixes (BM) of the display panel to thus improve the visibility of the 3D image, as shown in FIG. 2. In FIG. 2, when observed at a certain distance (D), a viewing angle (α), at which crosstalk is not generated theoretically, relies on the size of black matrixes (BM) of the display panel, the size of the black stripes (BS) of the patterned retarder, and a spacer (S) between the display panel and the patterned retarder. The viewing angle (α) widens as the sizes of the black matrixes and the black stripes are increased and as the spacer (S) between the display panel and the patterned retarder is reduced.

However, the related art has the following problems.

Figure 3:
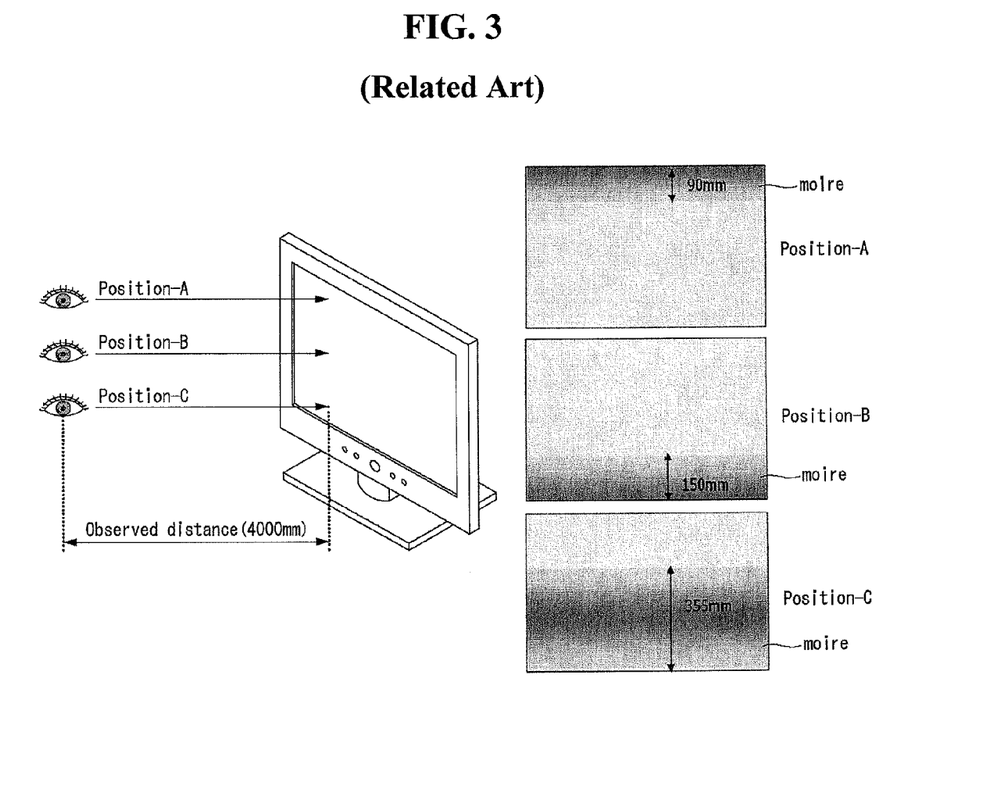
FIG. 3 illustrates moire generated due to the black stripe patterns in the related art image display device.

That is, first, the black stripes of the patterned retarder aimed for improving the visibility of the 3D image through enhancement of the viewing angle interact with the black matrixes of the display panel, generating moire. When a 2D image is displayed, the visibility of the 2D image is much degraded. FIG. 3 shows the results obtained by observing a display device sample with a size of 47 inches at a location away by 4 meters from the black stripe-applied display device. When the 2D image is displayed, moires of 90 mm, 150 mm, and 355 mm are visible according to the observation positions A, B, and C, respectively.

Figure 4:
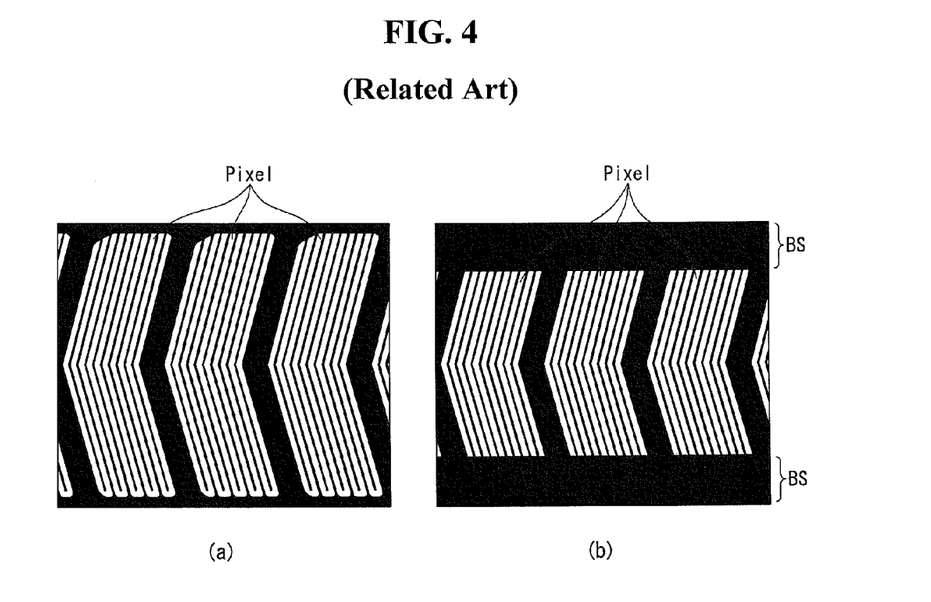
FIG. 4 illustrates a reduction in transmitted amount of light due to the black strip pattern in the related art image display device.

Second, the black stripes aimed for improving the visibility of the 3D image through enhancement of the viewing angle bring about a side effect that the luminance of the 2D image is drastically degraded. This is because, as shown in FIG. 4(*b*), in the related art, certain portions of pixels of the display panel are covered by the black stripe patterns. Accordingly, when the 2D image is displayed, the amount of transmitted light is reduced by about 30% compared with the case where black strips are not formed as shown in FIG. 4(*a*).

BRIEF SUMMARY

An aspect of this document is to provide an image display device capable of improving visibility of both a 2D image and a 3D image and minimizing a reduction in luminance in displaying a 2D image.

In one aspect, an image display device comprises: an image display panel that displays a 2D or 3D image; a driving circuit that applies a data voltage of a 2D data format for the 2D image or a data voltage of a 3D data format for the 3D image to the image display panel; and a controller that controls the driving circuit according to a 2D mode for displaying the 2D image or according to a 3D mode for displaying the 3D image, wherein R, G, and B subpixels of the image display panel each comprises first and second fine subpixels divided by one data line and two adjacent gate lines, and in the 2D mode, the same data voltage of the 2D data format is applied to the first and second fine subpixels, and in the 3D mode, the data voltage of the 3D data format is applied to the first fine subpixel and a black gray voltage is applied to the second fine subpixel.

When the image display panel is driven in the 3D mode, the data voltage supplied to the first fine subpixels are R, G, and B data voltages having a 3D data format respectively; the data voltage supplied to the second fine subpixels are black gray voltages.

The controller aligns data such that RGB digital video data in the 3D data format inputted from an external source and internally generated digital black data are alternately mixed one horizontal line by one horizontal line, and supplies the aligned data to the driving circuit.

When the image display panel is driven in the 2D mode, the data voltage supplied to the first fine subpixels and the data voltage supplied to the second fine subpixels are the same data voltages having the 2D data format.

The controller aligns data such that RGB digital video data in the 2D data format inputted from an external source are copied in units of one horizontal line and the inputted RGB digital video data and the copied RGB digital video data are alternately mixed one horizontal line by one horizontal line, and supplies the aligned data to the driving circuit.

The controller generates timing control signals for controlling an operation timing of the driving circuit by using timing signals applied from an external source and doubles the timing control signals by an integral multiple to control the driving circuit at a double frame frequency of a frame frequency in synchronization with input data.

The ratio of a vertical pitch of the second fine subpixels to the overall vertical pitch of the subpixels is determined according to a viewing angle of the 3D image and the luminance of the 3D image.

The viewing angle of the 3D image increases in proportion to the ratio of the vertical pitch of the second fine subpixels, and the luminance of the 3D image is reduced in proportion to the ratio of the vertical pitch of the second fine subpixels.

The first and second polarizations are mutually perpendicular.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE DRAWINGS AND THE PRESENTLY PREFERRED EMBODIMENTS

Exemplary embodiments of the present disclosure will now be described with reference to FIGS. 5 to 10.

Figure 5:
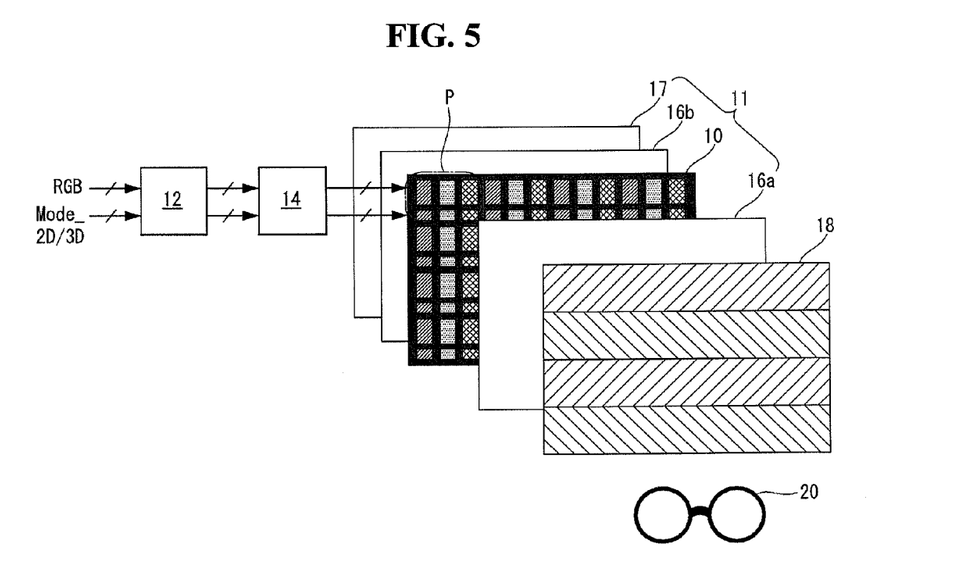
FIG. 5 is a schematic block diagram of an image display device according to an exemplary embodiment of the present disclosure.

FIG. 5 is a schematic block diagram of an image display device according to an exemplary embodiment of the present disclosure.

With reference to FIG. 5, the image display device according to an exemplary embodiment of the present disclosure includes a display element 11, a controller 12, a driving circuit 14, a patterned retarder 18, and polarization glasses 20. The display element 11 may be implemented as a flat panel display such as a liquid crystal display (LCD), a field emission display (FED), a plasma display panel (PDP), or an electroluminescence device (ELD) including an inorganic ELD and an organic light emitting diode (OLED). When the display element 11 is implemented as an LCD, the image display device may further include a backlight unit 17 disposed at a lower portion of an image display panel 10, an upper polarizer 16a disposed between the image display panel 10 and the patterned retarder 18, and a lower polarizer 16b disposed between the image display panel 10 and the backlight unit 17. In the following description, the case where the display element 11 is implemented as an LCD will be taken as an example for the sake of brevity. The patterned retarder 18 and the polarization glasses 20, 3D driving elements, implement binocular disparity by spatially separating a left eye image and a right eye image.

The image display panel 10 comprises two glass substrates and a liquid crystal layer interposed therebetween. The lower glass substrate includes a thin film transistor (TFT) array. The TFT array includes a plurality of data lines to which R, G, and B data voltages are supplied, a plurality of gate lines (or scan lines), crossing the data lines, to which gate pulses (or scan pulses) are supplied, a plurality of TFTs formed at crossings of the data lines and the gate lines, a plurality of pixel electrodes for charging the data voltages in liquid crystal cells, a storage capacitor connected to the pixel electrodes and sustaining the voltage of the liquid crystal cells. The upper glass substrate includes a color filter array. The color filter array includes black matrixes, color filters, and the like. In a vertical field driving method such as a twisted nematic (TN) mode and a vertical alignment (VA) mode, a common electrode which faces pixel electrodes to form an electric field is formed on the upper glass substrate, and in a horizontal field (i.e., in-plane field) driving method such as an in-plane switching (IPS) mode or a fringe field switching (FFS) mode, a common electrode is formed along with pixel electrodes on the lower glass substrate. The upper polarizer 16a is attached to the upper glass substrate, and the lower polarizer 16b is attached to the lower glass substrate. An alignment film is formed to set a pre-tilt angle of liquid crystal at an inner surface in contact with the liquid crystal. A column spacer may be formed between the glass substrates to sustain a cell gap of liquid crystal cells.

Figure 6:
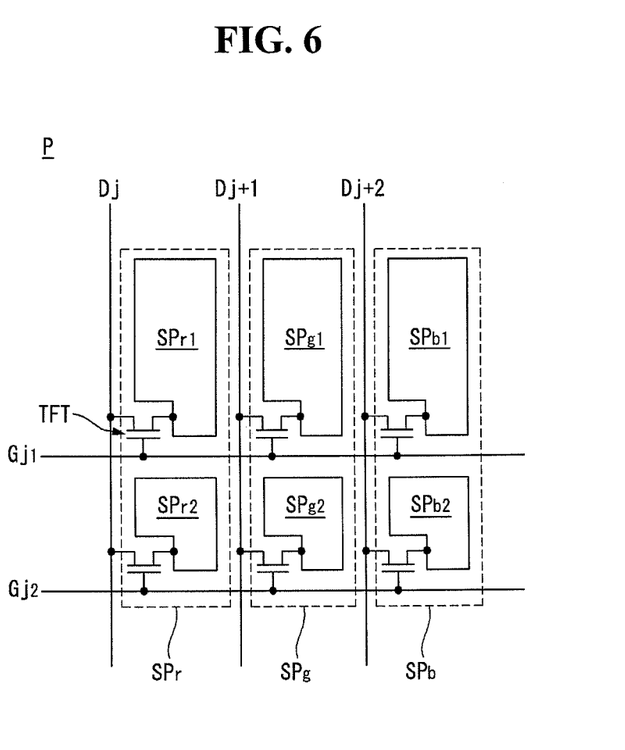
FIG. 6 is a detailed view illustrating a unit pixel structure of FIG. 5.

As shown in FIG. 6, a unit pixel (P) formed on the image display panel 10 includes an R subpixel (SPr), a G subpixel (SPg), and a B subpixel (SPb). In order to improve visibility of 2D and 3D images and in order to minimize degradation of luminance of the 2D image, each of the subpixels (SPr/SPg/SPb) is divided into two fine subpixels along a vertical direction, namely, into first fine subpixels (SPr1/SPg1/SPb1) and second fine subpixels (SPr2/SPg2/SPb2) in performing driving. To this end, one data line and two gate lines are allocated to each of the subpixels (SPr/SPg/SPb) by using a connection via the TFTs. The R subpixel SPr is divided into a first fine subpixel SPr1 charging a (1-1)th data voltage supplied from a first data line Dj in response to a gate pulse from a first gate line Gj1 and a second fine subpixel SPr2 charging a (1-2)th data voltage supplied from the first data line in response to a gate pulse from a second gate line Gj2. The G subpixel SPg is divided into a first fine subpixel SPg1 charging a (2-1)th data voltage supplied from a second data line (Dj+1) in response to the gate pulse from the first gate line Gj1 and a second fine subpixel SPg2 charging a (2-2)th data voltage supplied from the second data line Dj+1 in response to the gate pulse from the second gate line Gj2 in performing driving. The B subpixel SPb is divided into a first fine subpixel SPb1 charging a (3-1)th data voltage supplied from a third data line Dj+2 in response to the gate pulse from the first gate line Gj1 and a second fine subpixel SPb2 charging a (3-2)th data voltage supplied from the third data line Dj+1 in response to the gate pulse from the second gate line Gj2.

The image display panel 10 displays the 2D image in the 2D mode (Mode_2D) and the 3D image in the 3D mode (Mode_3D) under the control of controller 12.

Figure 7A:
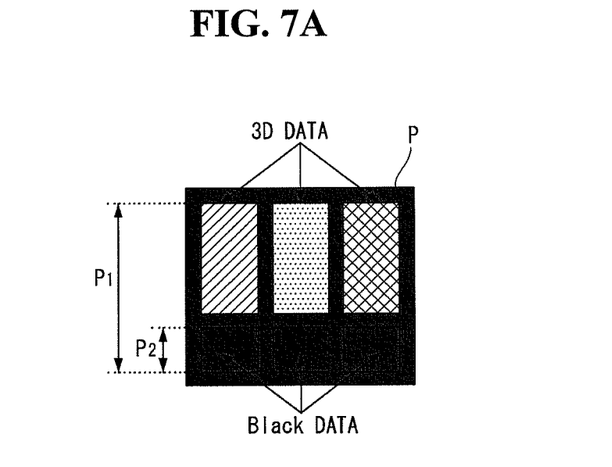
FIG. 7a illustrates a displayed state of pixels when a 3D image is displayed.

When the image display panel 10 is driven in the 3D mode (Mode_3D), the (1-1)th data voltage supplied to the first fine subpixel SPr1, the (2-1)th data voltage supplied to the first fine subpixel SPg1, and the (3-1)th data voltage supplied to the first fine subpixel SPb1 are R, G, and B data voltages having a 3D data format, respectively, as shown in FIG. 7a. When the image display panel 10 is driven in the 3D mode (Mode_3D), the (1-2)th data voltage supplied to the second fine subpixel SPr2, the (2-2)th data voltage supplied to the second fine subpixel SPg2, and the (3-2)th data voltage supplied to the second fine subpixel SPb2 are black gray voltages as shown in FIG. 7a. The black gray voltages are displayed between vertically adjacent 3D images to serve to increase a display interval between the 3D images. As a result, an up/down viewing angle is secured to be wide in the 3D mode (Mode_3D) by the second fine subpixels SPr2, SPg2, and SPb2 to which the black gray voltages are applied, improving the visibility. Thus, the present disclosure does not have such black stripe patterns on the patterned retarder as in the related art.

Figure 7B:
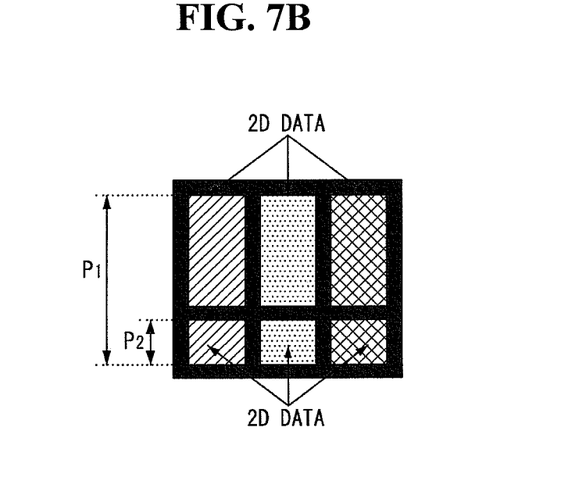
FIG. 7b illustrates a displayed state of pixels when a 2D image is displayed.

When the image display panel 10 is driven in the 2D mode (Mode_2D), the (1-1)th data voltage supplied to the first fine subpixel SPr1 and the (1-2)th data voltage supplied to the second fine subpixel SPr2 are the same R data voltages having the 2D data format as shown in FIG. 7b, the (2-1)th data voltage supplied to the first fine subpixel SPg1 and the (2-2)th data voltage supplied to the second fine subpixel SPg2 are the same G data voltages having the 2D data format as shown in FIG. 7b, and the (3-1)th data voltage supplied to the first fine subpixel SPb1 and the (3-2)th data voltage supplied to the second fine subpixel SPb2 are the same B data voltages having the 2D data format as shown in FIG. 7b. Degradation of the luminance in the 2D mode (Mode_2D) can be minimized by the second fine subpixels (SPr2/SPg2/SPb2) which are vertically adjacent to the first fine subpixels (SPr1/SPg1/SPb1) and receive the same R, G, and B data voltages as those applied to the first fine subpixels (SPr1/SPg1/SPb1), respectively.

Figure 8:
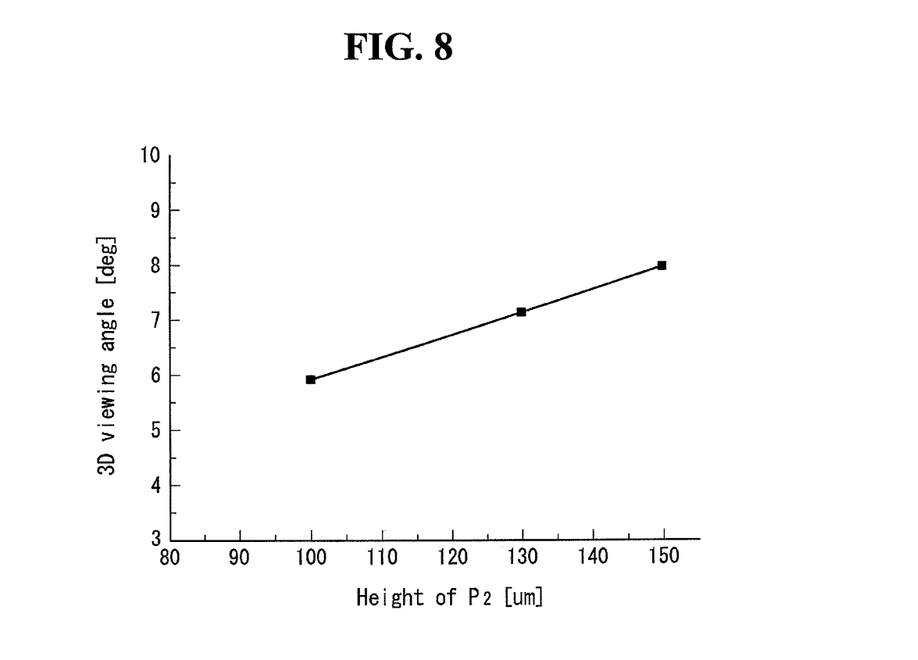
FIG. 8 is a graph of a 3D viewing angle over vertical pitches of a second fine subpixel.

A vertical pitch P2 of the second fine subpixels (SPr2/SPg2/SPb2) has a close relation with the 3D up/down viewing angle and the luminance of the 3D image. In other words, as shown in FIG. 8, the 3D up/down viewing angle widens as the ratio ((P2*100)/P1) of the vertical pitch P2 of the second fine subpixels (SPr2/SPg2/SPb2) to a vertical pitch P1 of the subpixels (SPr/SPg/SPb) is increased, and narrows as the ratio ((P2*100)/P1) is reduced. Meanwhile, the luminance of the 3D image is reduced as the ratio ((P2*100)/P1) is increased, and increased as the ratio ((P2*100)/P1) is reduced. Thus, the vertical pitch P2 of the second fine subpixels (SPr2/SPg2/SPb2) must be designed to have a suitable size in consideration of the relationship between the 3D up/down viewing angle and the luminance of the 3D image.

The driving circuit 14 comprises a data driving circuit for supplying RGB data voltages and black gray voltages to the data lines of the image display panel 10 and a gate driving circuit for sequentially supplying gate pulses to the gate lines of the image display panel 10. The data driving circuit converts the RGB digital video data of the 3D data format inputted from the controller 12 in the 3D mode (Mode_3D) into analog gamma voltages to generate RGB data voltages, and converts digital black data inputted from the controller 12 into analog gamma voltages of a peak black gray level to generate black gray voltages. The data driving circuit alternately supplies the RGB data voltages and the black gray voltages to the data lines of the image display panel 10 in the cycles of one horizontal period under the control of the controller 12. Meanwhile, the data driving circuit converts the RGB digital video data of the 2D data format inputted from the controller 12 in the 2D mode (Mode_2D) into analog gamma voltages to generate RGB data voltages, and supplies the RGB data voltages to the data lines of the image display panel 10 under the control of the controller 12. Because two gate lines are allocated per unit pixel (P), the gate driving circuit sequentially drives the gate lines which are twice in number for the vertical resolution.

The controller 12 controls the driving circuit 14 in the 2D mode (Mode_2D) or the 3D mode (Mode_3D) in response to a 2D/3D mode select signal from the user inputted through a user interface or a 2D/3D identification code extracted from an input image signal. In the 3D mode (Mode_3D), the controller 12 mixes the RGB digital video data inputted in the 3D data format from the exterior and internally generated digital black data one horizontal line by one horizontal line, respectively, to rearrange the RGB digital video data and the digital black data, and supplies the rearranged data to the data driving circuit. Meanwhile, in the 2D mode (Mode_2D), the controller 12 copies the RGB digital video data inputted in the 2D data format from the exterior in units of one horizontal line by using a memory or the like, aligns in an overlapping manner the RGB digital video data by mixing the input RGB digital video data and the copied RGB digital video data one horizontal line by one horizontal line, respectively, and supplies the aligned data to the data driving circuit.

The controller 12 generates timing control signals for controlling an operation timing of the driving circuit 14 by using timing signals such as a vertical synchronization signal, a horizontal synchronization signal, a dot clock, a data enable signal, and the like. The controller 12 may drive the driving circuit 14 at a frame frequency of N×60 Hz, e.g., 120 Hz, a frame frequency which is twice the input frame frequency, by doubling the timing control signals by an integral multiple. In this case, in the 3D mode (Mode_3D), the controller 12 may control the driving circuit 14 to apply the RGB data voltages to the first fine subpixels (SPr1,SPg1,SPb1) at the frame frequency of 120 Hz and the black gray voltages to the second fine subpixels (SPr2,SPg2,SPb2) at the frame frequency of 120 Hz. Also, in the 2D mode (Mode_2D), the controller 12 may control the driving circuit 14 to apply the RGB data voltages to the first fine subpixels (SPr1,SPg1,SPb1) at the frame frequency of 120 Hz and the same RGB data voltages as those applied to the first fine subpixels (SPr1,SPg1,SPb1) to the second fine subpixels (SPr2,SPg2,SPb2) at the frame frequency of 120 Hz.

The backlight unit 17 comprises one or more light sources and a plurality of optical members that convert light from the light sources into surface light sources and irradiate the same to the image display panel 10. The light source may include one or two or more types of HCFL (Hot Cathode Fluorescent Lamp), CCFL (Cold Cathode Fluorescent Lamp), EEFL (External Electrode Fluorescent Lamp), FFL (Flange Focal Length), and LED (Light Emitting Diode). The optical members, including a light guide plate, a diffusion plate, a prism sheet, a diffusion sheet, and the like, increase surface uniformity of light from the light sources.

The patterned retarder. 18 may be patterned on one of the glass substrate, the transparent plastic substrate, and a film. The substrate or the like with the patterned retarder 18 formed thereon is attached to the upper polarizer 16a by an adhesive. The patterned retarder 18, including first and second retarders whose light absorption axes are perpendicular to each other, divides the 3D image into polarization components. The first retarder is formed at odd numbered lines of the patterned retarder 18 and allows a first polarization (circular polarization and linear polarization) component of light made incident through the upper polarizer 16a to transmit therethrough. The second retarder is formed at even numbered lines and allows a second polarization (circular polarization or linear polarization) component of light made incident through the upper polarizer 16a to transmit therethrough. For example, the first retarder may be implemented as a polarization filter allowing transmission of a left circular polarization, and the second retarder may be implemented as a polarization filter allowing transmission of a right circular polarization. Meanwhile, in case of the 2D image, the patterned retarder 18 allows it to transmit therethrough without dividing it into polarization components.

The polarization glasses 20 are implemented such that its light absorption axis differs depending on the polarization components outputted from the patterned retarder 18. For example, the left eye of the polarization glasses 20 allows the left circular polarization made incident from the first retarder of the patterned retarder 18, blocking light of other polarization components, and the right eye of the polarization glasses 20 allows transmission of the right circular polarization made incident from the second retarder of the patterned retarder 18, blocking light of other polarization components. The left eye of the polarization glasses 20 includes a left circular polarization filter, and the right eye of the polarization glasses 20 includes a right circular polarization filter.

Figure 9:
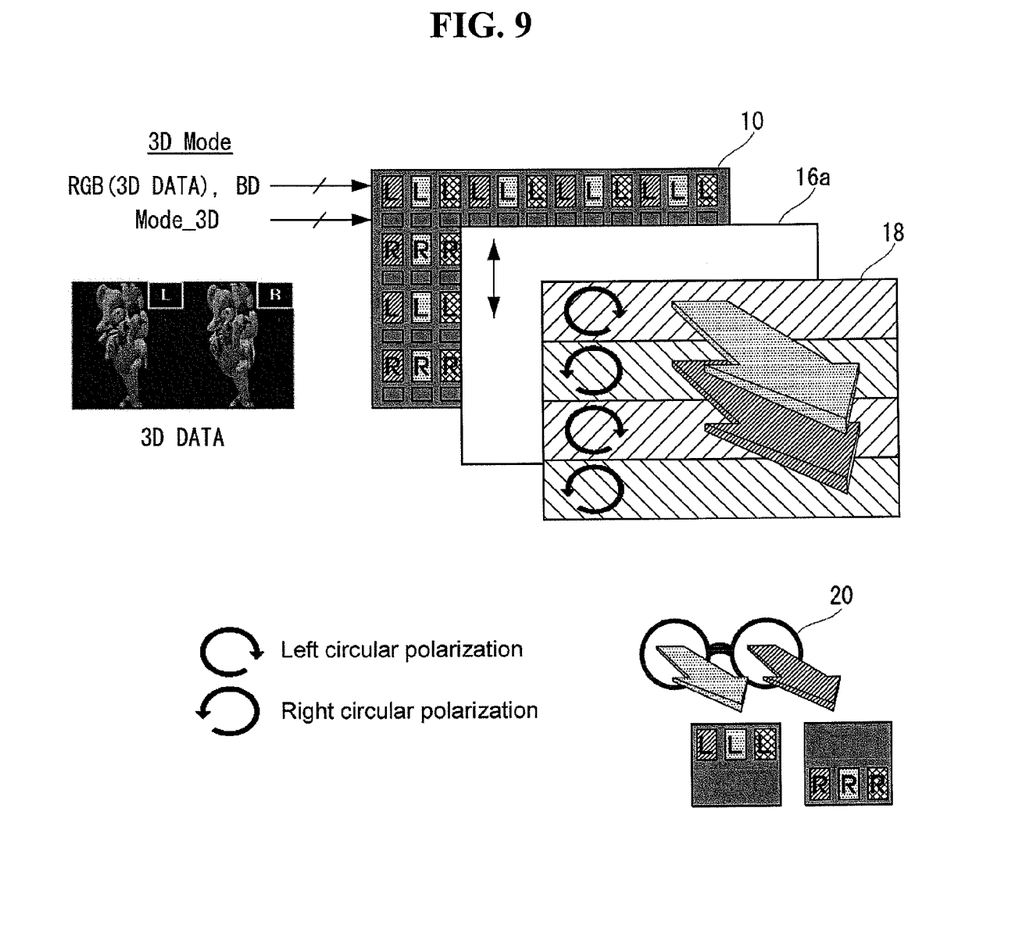
FIG. 9 is a schematic view illustrating the operation of the image display device in a 3D mode.

FIG. 9 is a schematic view illustrating the operation of the image display device in the 3D mode.

With reference to FIG. 9, in the 3D mode (Mode_3D), the left eye RGB data voltages and right eye RGB data voltages of the 3D data format are alternately applied in units of two horizontal lines to the first fine subpixels disposed at the odd numbered horizontal lines of the image display panel 10. As a result, left eye RGB images (L) are sequentially displayed on the first fine subpixels disposed at the (2i−1)th horizontal lines (i is a positive odd number), and right eye RGB images (R) are sequentially displayed at the first fine subpixels disposed at the (2i+1)th horizontal lines. Such left eye RGB images (L) and the right eye RGB images (R) are divided into polarization components by the first and second retarders formed by lines at the patterned retarder 18. The left eye RGB images (L) which have been transmitted through the first retarder are transmitted to the left eye of the polarization glasses 20, and the right eye RGB images (R) which have been transmitted through the second retarder are transmitted to the right eye of the polarization glasses 20, thus displaying the 3D image.

In the 3D mode (Mode_3D), the black gray voltages BD are applied to the second fine subpixels disposed at the even numbered horizontal lines of the image display panel 10. The second fine sub-pixels displaying a black image upon receiving the black gray voltages BD serve to increase the display interval of the left eye RGB images (L) and the right eye RGB images (R) which are vertically adjacent to be displayed. Thus, in the 3D mode (Mode_3D), the up/down viewing angle is widely secured to drastically improve the 3D visibility.

Figure 10:
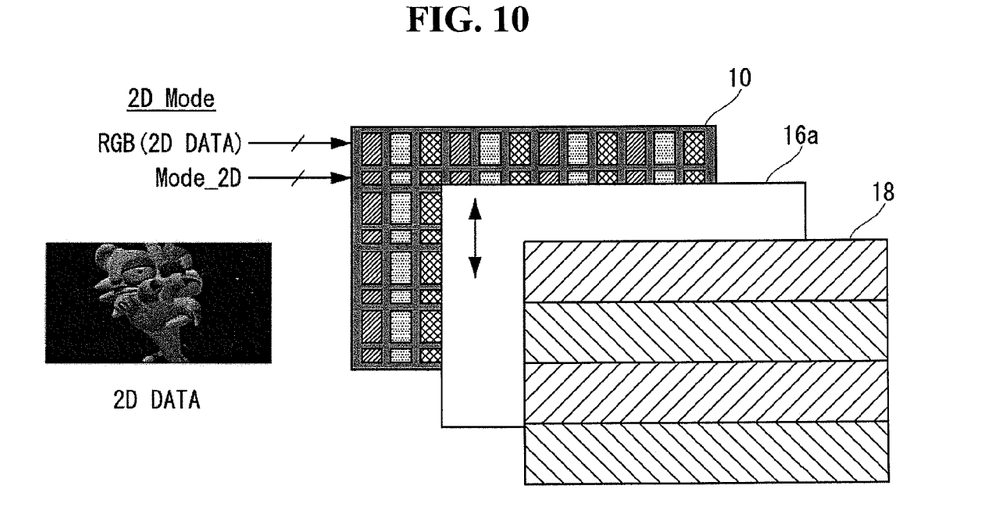
FIG. 10 is a schematic view illustrating the operation of the image display device in a 2D mode.

FIG. 10 is a schematic view illustrating the operation of the image display device in the 2D mode.

With reference to FIG. 10, in the 2D mode (Mode_2D), RGB data voltages of the 2D data format are applied to the first fine subpixels disposed at the odd numbered horizontal lines of the image display panel 10, and the same RGB data voltages of the 2D data format as those applied to the first fine subpixels vertically adjacent to the second fine subpixels are applied to the second fine subpixels disposed at the even numbered horizontal lines of the image display panel 10. In other words, the same R data voltage is applied to the first and second fine subpixels vertically adjacent to constitute the R subpixel, the same G data voltage is applied to the first and second fine subpixels vertically adjacent to constitute the G subpixel, and the same B data voltage is applied to the first and second fine subpixels vertically adjacent to constitute the B subpixel. Because the RGB image by the RGB data voltages has the 2D data format, it is transmitted through the patterned retarder 18 as it is so as to be displayed for the user.

In the 2D mode (Mode_2D), degradation of luminance is minimized by the second fine subpixels vertically adjacent to the first fine subpixels, respectively, to which the same RGB data voltages as those applied to the first fine subpixels are applied. In addition, because the patterned retarder 18 does not have black stripe patterns, degradation of visibility of the 2D image otherwise due to moire can be prevented.

Figure 11:
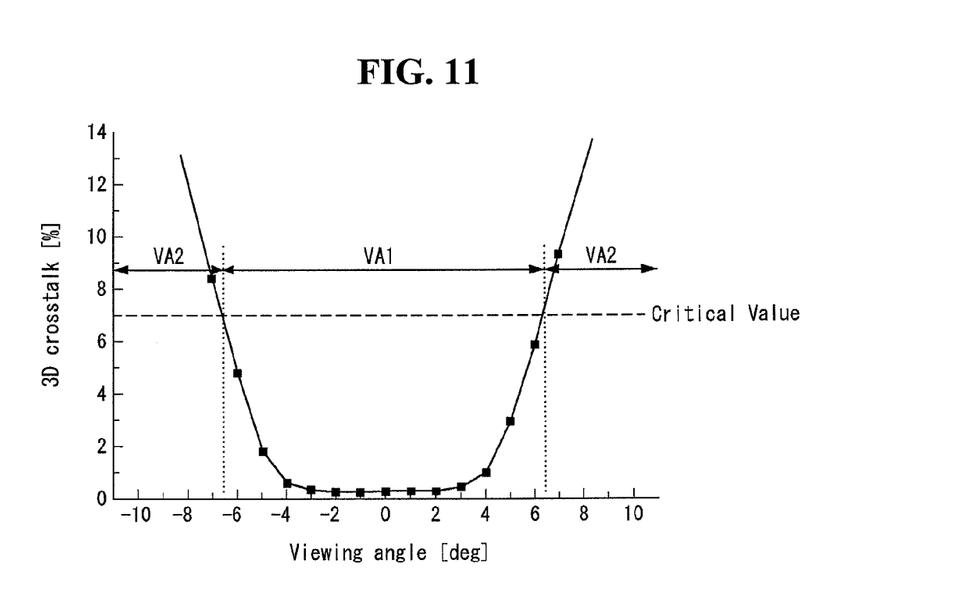
FIG. 11 is a graph of a crosstalk value of a 3D image over the 3D viewing angle.

FIG. 11 is a graph of a crosstalk value of the 3D image over the 3D viewing angle. In FIG. 11, a horizontal axis indicates up (+)/down (−) viewing angle [deg] of the 3D image, and a vertical axis indicates a 3D crosstalk value [%].

In the image display device that displays the 3D image with the image display panel alternately displaying the left eye image and the right eye image in units of the horizontal lines and the patterned retarder positioned at a certain distance from the image display panel and changing polarization characteristics in units of the horizontal lines, as mentioned above, the left eye image must pass through only the left eye retarder and the right eye image must pass through only the right eye retarder to display a 3D image of good picture quality. However, when observed from the up/down viewing angle position, not the front side, the left eye image may pass through the right eye retarder as well as the left eye retarder and the right eye image may pass through the left eye retarder as well as the right eye retarder, generating a 3D crosstalk (C/T). The generated 3D crosstalk (C/T) may be represented by Equation 1 shown below:

$$C/T\ [\%] = \frac{L_{Black}R_{White} - \text{Black}}{L_{White}R_{Black} - \text{Black}} \times 100 \quad \text{[Equation 1]}$$

Here, '$L_{Black}R_{White}$' is a luminance value of the pattern displaying black at the left eye pixels and white at the right eye pixels, '$L_{White}R_{Black}$' is a luminance value of the pattern displaying white at the left eye pixels and black at the right eye pixels. 'Black' is a luminance value measured after black is displayed on the entire pixels. In general, a viewing angle when the value of the 3D crosstalk (C/T) calculated through Equation 1 is 7% or less is defined as the 3D viewing angle at which a 3D image of good picture quality is obtained. Thus, the 7% 3D crosstalk (C/T) value is a critical value for determining a 3D viewing angle to obtain good 3D image. However, this critical value (7%) may vary depending on models of image display devices.

As noted in the graph of FIG. 11, the user can view a 3D image of good picture quality within the viewing angle range (VA1) in which the 3D crosstalk value [%] is smaller than the predetermined critical value (e.g., 7%), while the user cannot view such a 3D image of good picture quality within the viewing angle range (VA2) in which the 3D crosstalk value [%] exceeds the predetermined critical value (7%) because the left eye and right eye images overlap.

Figure 12:
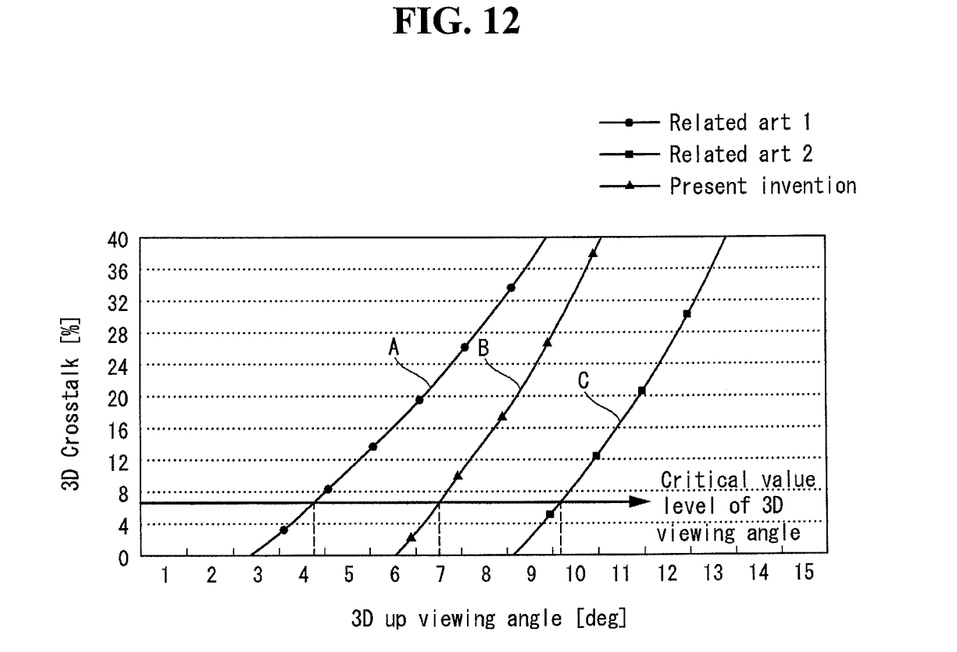
FIG. 12 is a graph showing the comparison between the up viewing angle of the 3D image according to an exemplary embodiment of the present disclosure and the related arts.

FIG. 12 is a graph showing the comparison between the up viewing angle of the 3D image according to an exemplary embodiment of the present disclosure and the related arts. In FIG. 12, the horizontal axis indicates the up viewing angle (deg) of the 3D image, and the vertical axis indicates the crosstalk value (%) of the 3D image.

In the graph of FIG. 12, a line 'A' indicates an up viewing angle of a first related art in which left and right eye images have a display interval of 80 μm by black matrixes and a patterned retarder does not have black stripes. It is noted that the up viewing angle range satisfying the critical value (e.g., 7%) of the 3D crosstalk is 0° to 4°, very narrow. A line 'C' indicates an up viewing angle of a second related art in which left and right eye images have a display interval of 80 μm by black matrixes and a patterned retarder have black stripe patterns with a width of 210 μm. It is noted that the up viewing angle range satisfying the critical value (e.g., 7%) of the 3D crosstalk is 0° to 10°, relatively wide. However, as aforementioned, the second related arts have the side effects that the visibility and luminance of the 2D image are degraded due to the presence of the black stripe patterns for securing the viewing angle.

By contrast, in the present disclosure, the subpixels each are divided into the first and second fine subpixels, and in displaying a 2D image, the same RGB data voltages are applied to the first and second fine subpixels, and in displaying a 3D image, the RGB data voltages are applied to the first fine subpixels and the black gray voltages are applied to the second fine subpixels. Accordingly, when the 3D image is displayed, the display interval of the left eye image and the right eye image can be secured by 200 μm without black strip patterns, and thus, the up viewing angle range satisfying the critical value (e.g., 7%) of the 3D crosstalk can widen by about 0° to 7° as shown by a line 'B' in the graph of FIG. 12, without degrading the visibility and luminance of the 2D image.

As described above, the image display device according to the present disclosure can improve the visibility of both 2D and 3D images as well as minimizing the reduction in the luminance, in particular, in displaying a 2D image.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. An image display device comprising:
   an image display panel that displays at least one of a 2D and 3D image;
   a driving circuit that applies at least one of a data voltage of a 2D data format for the 2D image and a data voltage of a 3D data format for the 3D image to the image display panel;
   a controller that controls the driving circuit according to at least one of a 2D mode for displaying the 2D image and a 3D mode for displaying the 3D image; and
   a patterned retarder disposed in front of the image display panel that divides light from the image display panel into light of first polarization and light of second polarization in the 3D mode,
   wherein R, G, and B subpixels of the image display panel each include first and second fine subpixels divided by one data line and two adjacent gate lines, and
   wherein in the 2D mode, the same data voltage of the 2D data format is applied to the first and second fine subpixels, and in the 3D mode, the data voltage of the 3D data format is applied to the first fine subpixel and a black gray voltage is applied to the second fine subpixel.

2. The device of claim 1, wherein when the image display panel is driven in the 3D mode, the data voltage supplied to the first fine subpixels are R, G, and B data voltages having a 3D data format respectively; the data voltage supplied to the second fine subpixels are black gray voltages.

3. The device of claim 2, wherein the controller aligns data such that RGB digital video data in the 3D data format inputted from an external source and internally generated digital black data are alternately mixed one horizontal line by one horizontal line, and supplies the aligned data to the driving circuit.

4. The device of claim 1, wherein when the image display panel is driven in the 2D mode, the data voltage supplied to the first fine subpixels and the data voltage supplied to the second fine subpixels are the same data voltages having the 2D data format.

5. The device of claim 4, wherein the controller aligns data such that RGB digital video data in the 2D data format inputted from an external source are copied in units of one horizontal line and the inputted RGB digital video data and the copied RGB digital video data are alternately mixed one horizontal line by one horizontal line, and supplies the aligned data to the driving circuit.

6. The device of claim 1, wherein the controller generates timing control signals for controlling an operation timing of the driving circuit by using timing signals applied from an external source and doubles the timing control signals by an integral multiple to control the driving circuit at a double frame frequency of a frame frequency in synchronization with input data.

7. The device of claim 1, wherein the ratio of a vertical pitch of the second fine subpixels to the overall vertical pitch of the subpixels is determined according to a viewing angle of the 3D image and a luminance of the 3D image.

8. The device of claim 7, wherein the viewing angle of the 3D image increases in proportion to the ratio of the vertical pitch of the second fine subpixels, and the luminance of the 3D image is reduced in proportion to the ratio of the vertical pitch of the second fine subpixels.

9. The device of claim 1, wherein the first and second polarizations are mutually perpendicular.

* * * * *